J. H. LEE.
SEED-PLANTER.
No. 183,180. Patented Oct. 10, 1876.
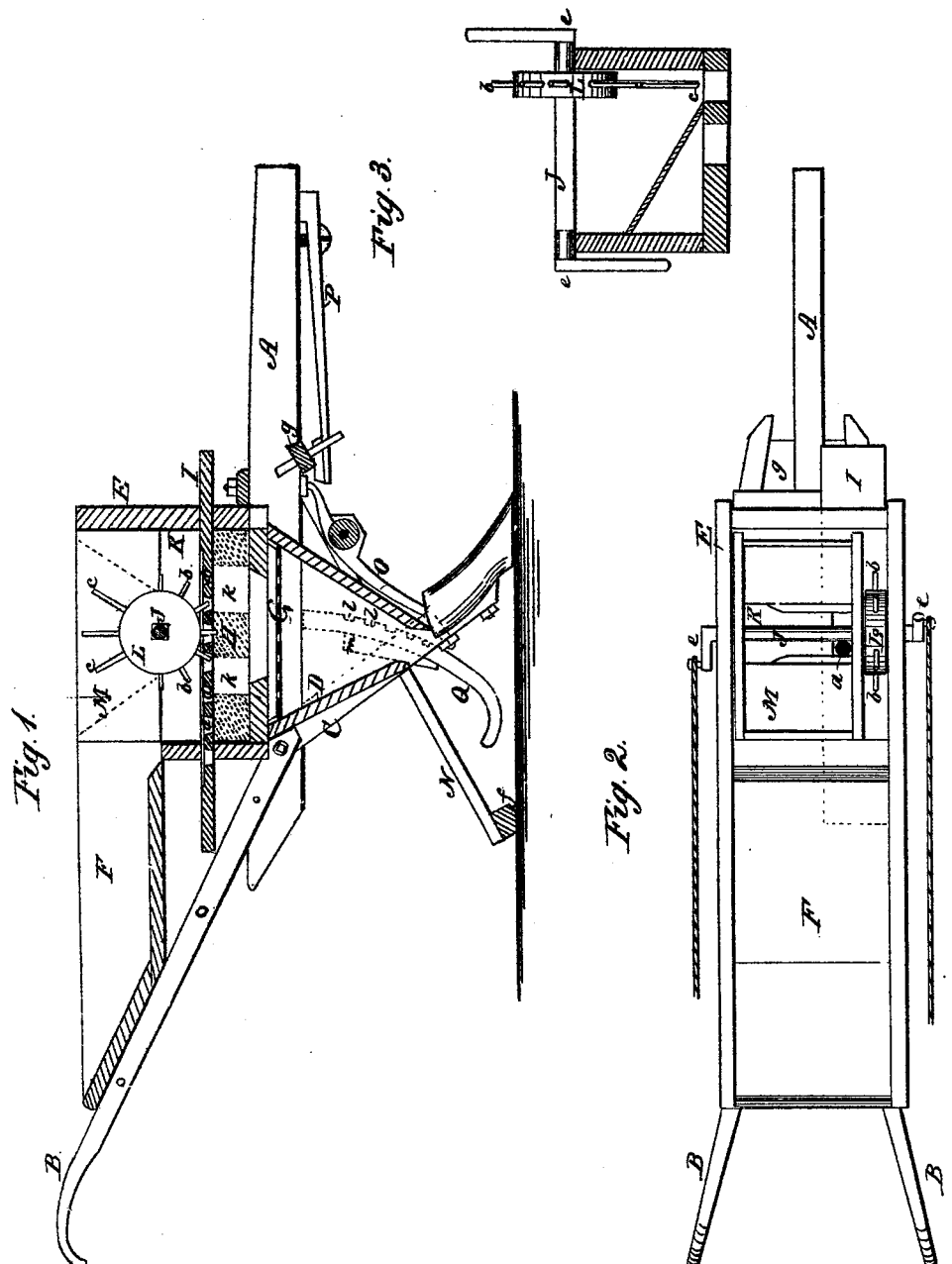
WITNESSES:
W. W. Hollingsworth
Solon C. Kemon
INVENTOR:
John H. Lee
BY
Kemon & C.
ATTORNEYS.

UNITED STATES PATENT OFFICE.

JOHN H. LEE, OF LIVINGSTON, ALABAMA.

IMPROVEMENT IN SEED-PLANTERS.

Specification forming part of Letters Patent No. 183,180, dated October 16, 1876; application filed August 15, 1876.

*To all whom it may concern:*

Be it known that I, JOHN H. LEE, of Livingston, in the county of Sumter and State of Alabama, have invented a new and Improved Seed-Planter; and I do hereby declare that the following is a full, clear, and exact description of the same, reference being had to the accompanying drawing, forming part of this specification, in which—

Figure 1 is a vertical longitudinal section; Fig. 2, a plan view; Fig. 3, a detail, showing the devices arranged for planting cotton.

My invention relates to an improved construction of seed-planter designed to plant corn, pease, beans, rice, turnip-seed, and cotton-seed, either in hills or rows, as may be desired.

The invention consists in the particular construction and arrangement of parts hereinafter described, in which an ordinary plow is fitted up with detachable seeding devices, and is adapted to independent use as a plow or a combined use as a seed-planter, thus forming an efficient and economical implement for farmers who are possessed only of a single horse.

In the accompanying drawing, A represents the beam, B the handles, and C the stock, of an ordinary plow. To the mold-board side of the plow is attached a chute, D, and immediately above the same a detachable seed-box, E, and hopper F. The seed-box E is supported upon the beam, and provided with an opening in its bottom, that communicates with the chute D, a perforated plate, G, being interposed between the same to retard the passage of the seed in drilling. In the bottom of the seed-box fits a frame, H, having holes $k$, that register with the opening in the bottom of the seed-box, just above which holes moves a slide, I. This slide is provided with a hole, $a$, which, as it moves back and forth, opens and closes communication between the hopper above and the chute below, so as to allow a portion of seed to drop through to form a hill. Said slide is reciprocated or moved back and forth by means of an oscillating shaft, J. This shaft is journaled in bearings in the grain-box, and carries a wheel, L, that occupies a space between the bottom K of the hopper and the side of the grain-box. This wheel is provided upon one side with a set of short spikes, $b$, and upon the opposite with a set of long spikes, $c$. The short spikes enter a series of holes, $d$, in the slide, and, as the shaft J is rocked, cause it to move back and forth, while the long spikes are for a purpose hereinafter described. This rocking of the shaft is effected through crank-arms $e$, that are affixed to the same upon the outside of the grain-box, upon opposite sides of the shaft, which arms are connected by means of cords with the knees of the driver, so that in walking the alternate movement of the legs oscillates the shaft and controls the operation of the seeding devices. The advantage of this arrangement is, that the driver has perfect control over the seeding devices, as, by advancing to the plow and slackening the cords, he can at will stop the seeding when turning the rows, which same expedient may be resorted to to plant the hills farther apart or closer together, according to the fertility of the land. M is a smaller hopper for containing seed, which hopper is contained inside of the main hopper F, and rests on its detachable bottom portion K, to form the upper portion of the bearing for the feed-shaft.

The implement as thus described is adjusted for planting ordinary grain in hills, but is applicable, with slight modifications, to various uses, as, when used for planting cotton-seed, the smaller hopper is removed and the larger one used for containing the seed. The bottom K of the hopper, together with the slide I, frame H, and perforate plate G, is then removed. An inclined bottom is then placed in the grain-box, to cause the cotton-seed to gravitate to the feed-opening, and the long spikes of the wheel are turned down, so as to operate as separators and stirrers for the seed. The apparatus then presents the appearance shown in Fig. 3, and is adapted to the successful planting of cotton-seed.

In order to mash the clods and cover the seed properly without using a heavy block, I have constructed a special device for this purpose, operating in connection with the planter, as hereinbefore described. It consists of a pair of bars, N, projecting downwardly, and to the rear of the plow, and provided with a cross-bar, $f$, forming a coverer, and connected at the top by a cross-bar, $g$. The said bars N are pivoted near their upper ends to a brace, O, of the plow-stock, and a thong-spring, P, attached to the under side of the plow-beam passes upwardly against the cross-bar $g$, and forces the coverer-block $f$ against the ground, thus securing an elastic pressure without a heavy weight, which pressure may be suitably regulated by a set-screw. Q is an adjustable bar, located in the stock of the plow, and projecting to the rear. This bar is adjusted by means of notches $l$ and key $m$, and while serving to regulate the depth the plow is to go also serves as a rudder, as it were, to prevent the wabbling of the plow, and by holding the devices steady lightens the draft and lessens the labor to the plowman.

The feeding devices, as hereinbefore described, are adapted to be used in connection with the plow or not, and they are detachably held together upon the same by means of dowel-pins and hooks. The plow-stock is also adapted to receive different forms of plows, which renders it capable of extensive independent use.

Referring to the features of the coverer and rearwardly-projecting bar Q, I would state that I am aware that a spring-pressed coverer is not, broadly, new; and I therefore limit this feature of my invention to the particular construction and arrangement of the thong-spring, arranged beneath the plow-beam, with the coverer $N f g$, pivoted to the brace O of the plow-stock.

Having thus described my invention, what I claim as new is—

1. The combination, with the plow-frame A B C, of the chute D, grain-box E, hopper F, slide I, having holes $a$ and $d$, and the shaft J, carrying the spiked wheel L, adapted to be oscillated, as described, and for the purpose set forth.

2. The combination, with the grain-box E, of the slide I, having holes $a$ and $d$, the frame H, having holes $k$, the shaft J, with wheel L, having long spikes $c$ and short spikes $d$, and the hoppers F M, substantially as and for the purpose described.

3. The combination, with the planter and its plowing devices, of a coverer composed of the frame $N f g$, pivoted to the brace-bar O of the plow, and a thong-spring, P, fastened beneath the plow-beam, and pressing at its rear end upwardly against the coverer-frame, substantially as and for the purpose described.

JOHN H. LEE.

Witnesses:
 HUGH WHITE,
 B. HAWKINS.